United States Patent
Herthan et al.

(10) Patent No.: US 9,599,971 B2
(45) Date of Patent: Mar. 21, 2017

(54) METHOD FOR OPERATING AN ELECTRICAL SYSTEM OF A MOTOR VEHICLE AND BUS SYSTEM HAVING MASTER AND SLAVE CONTROLLERS OPERATING IN ACCORDANCE WITH THE METHOD

(71) Applicant: BROSE FAHRZEUGTEILE GMBH & CO. KOMMANDITGESELLSCHAFT, Hallstadt (DE)

(72) Inventors: Bernd Herthan, Michelau (DE); Burkhard Wagner, Ebersdorf (DE); Armin Feustel, Bamberg (DE); Stefan Schiegel, Bad Staffelstein (DE); Matthias Buehler, Hallstadt (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 724 days.

(21) Appl. No.: 13/913,769

(22) Filed: Jun. 10, 2013

(65) Prior Publication Data
US 2013/0274897 A1    Oct. 17, 2013

Related U.S. Application Data

(63) Continuation of application No. PCT/EP2011/006020, filed on Dec. 1, 2011.

(30) Foreign Application Priority Data

Dec. 8, 2010   (DE) .......................... 10 2010 053 803

(51) Int. Cl.
*G06F 1/26* (2006.01)
*G05B 11/01* (2006.01)
(Continued)

(52) U.S. Cl.
CPC ............ *G05B 11/01* (2013.01); *H04L 12/403* (2013.01); *H04L 12/40039* (2013.01);
(Continued)

(58) Field of Classification Search
CPC ....................................................... G06F 1/32
See application file for complete search history.

(56) References Cited

U.S. PATENT DOCUMENTS 6,201,316 B1    3/2001  Knecht
7,117,348 B2 *  10/2006  Holmberg ................ G06F 8/65
                                                    713/1
(Continued)

FOREIGN PATENT DOCUMENTS

CN    101700762 A    5/2010
EP     0829786 A2    3/1998
(Continued)

OTHER PUBLICATIONS

International Search Report of PCT/EP2011/006020, Dated Mar. 23, 2012.

*Primary Examiner* — Mohammed Rehman
(74) *Attorney, Agent, or Firm* — Laurence A. Greenberg; Werner H. Stemer; Ralph E. Locher

(57) ABSTRACT

A method operates an onboard power supply system in a motor vehicle. The onboard power supply system has a master controller and a slave controller, in which the master controller communicates with the slave controller via a subsidiary bus system and a further onboard power supply system component via a main bus system. Present requests are received in the slave controller and in response to the present requests, performing one of: putting the slave controller into an operating mode and switching the master controller to a transmission mode, in which the master controller coordinates communication between the slave controller and the onboard power supply system component;
(Continued)

or putting the slave controller into a sleep mode and switching the master controller to an undertaking mode, in which the master controller responds to queries from the onboard power supply system component to the slave controller.

5 Claims, 1 Drawing Sheet

(51) Int. Cl.
    *H04L 12/40*     (2006.01)
    *H04L 12/403*     (2006.01)
    *H04L 12/46*     (2006.01)

(52) U.S. Cl.
    CPC ..... *H04L 12/4625* (2013.01); *H04L 2012/40215* (2013.01); *H04L 2012/40234* (2013.01); *H04L 2012/40241* (2013.01); *H04L 2012/40273* (2013.01); *Y02B 60/32* (2013.01)

(56) References Cited

U.S. PATENT DOCUMENTS

| | | | |
|---|---|---|---|
| 7,826,944 B2 | 11/2010 | Oesterling et al. | |
| 8,634,941 B2* | 1/2014 | Ploix | G05B 19/0423 375/238 |
| 8,718,797 B1* | 5/2014 | Addepalli | H04W 4/046 700/17 |
| 8,909,963 B2 | 12/2014 | Rott et al. | |
| 9,207,661 B2* | 12/2015 | Costin | G05B 19/0428 |
| 2002/0006139 A1 | 1/2002 | Kikkawa et al. | |
| 2006/0111827 A1* | 5/2006 | Russlies | H03G 3/32 701/49 |
| 2009/0177352 A1* | 7/2009 | Grau | G07C 5/008 701/31.4 |
| 2010/0031212 A1* | 2/2010 | Dong | G06F 17/50 716/100 |
| 2010/0195552 A1* | 8/2010 | Ho | H04W 52/0216 370/311 |
| 2010/0235668 A1* | 9/2010 | Cheshire | G06F 1/3209 713/323 |
| 2011/0093165 A1* | 4/2011 | Miller | B60R 22/48 701/36 |
| 2012/0030330 A1* | 2/2012 | Rocher | G06F 15/173 709/223 |
| 2012/0169231 A1* | 7/2012 | Dinc | B60Q 3/0293 315/77 |
| 2012/0233478 A1* | 9/2012 | Mucignat | H04L 12/2825 713/320 |
| 2013/0073764 A1* | 3/2013 | Deb | H04L 12/66 710/241 |

FOREIGN PATENT DOCUMENTS

| | | |
|---|---|---|
| WO | 2010070218 A1 | 6/2010 |
| WO | 2010112173 A2 | 10/2010 |

* cited by examiner

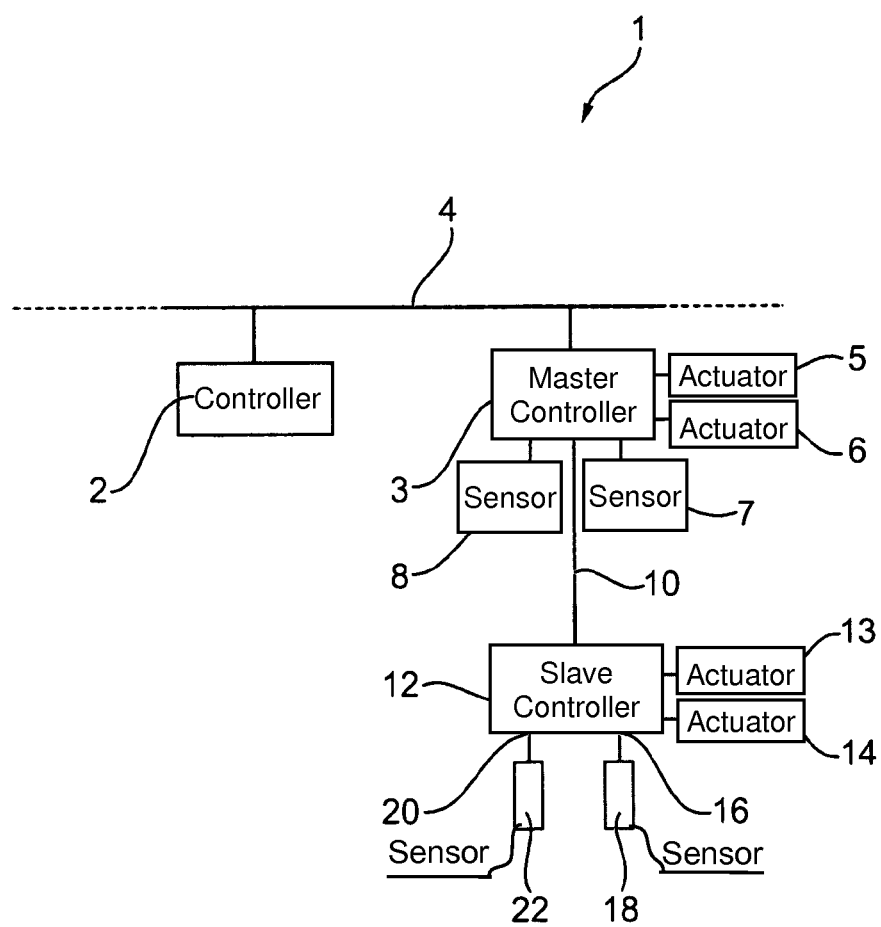

METHOD FOR OPERATING AN ELECTRICAL SYSTEM OF A MOTOR VEHICLE AND BUS SYSTEM HAVING MASTER AND SLAVE CONTROLLERS OPERATING IN ACCORDANCE WITH THE METHOD

CROSS-REFERENCE TO RELATED APPLICATION

This application is a continuation, under 35 U.S.C. §120, of copending international application No. PCT/EP2011/006020, filed Dec. 1, 2011, which designated the United States; this application also claims the priority, under 35 U.S.C. §119, of German patent application No. DE 10 2010 053 803.5, filed Dec. 8, 2010; the prior applications are herewith incorporated by reference in their entirety.

BACKGROUND OF THE INVENTION

Field of the Invention

The invention relates to a method for operating an onboard power supply system in a motor vehicle, having a master controller and a slave controller, and also to a bus system operating on the basis of the method.

Within a motor vehicle, a large number of controllers are used, each of which is usually connected to at least one associated actuator and/or sensor. The relevant controller controls the actuator and evaluates the sensor data delivered, with the control being effected using the sensor data for example. Frequently, however, the control is affected on the basis of requests which are retrieved from a further controller. This requires the controllers to be connected by a data line.

In order to reduce the cabling within the motor vehicle, the controllers are normally connected by a main bus system, for example CAN bus system. In this case, there is a central data line to which a number of controllers are connected. The data line is used to transmit messages. By indicating an addressee or a group of addressees for the message, there is the assurance that the respectively intended controller reacts to the message.

Usually, a plurality of controllers is combined to form a subsystem, for example door controllers in the motor vehicle. Since the subgroups are normally of homogeneous design in comparison with the whole onboard power supply system, it is possible to use within the subsystem a bus system which, although it does not have the bandwidth and flexibility of the main bus system, is cheaper to produce. One of the controllers in the subsystem then frequently undertakes the control of the subsidiary bus system. The controller is called the master controller.

Published, European patent application EP 0 829 786 A2 discloses an interconnection of a master controller with at least one further controller, wherein the master controller undertakes the communication with further components of the onboard power supply system. To save power, the master controller puts all of the controllers in the subsystem into a quiescent-current consumption state as soon as there are no present requests to the subsystem. The whole subsystem is put back into a normal consumption state following a request to one of the controllers.

SUMMARY OF THE INVENTION

The invention is based on the object of specifying an energy-efficient method for operating an onboard power supply system and also an energy-efficient bus system.

Accordingly, a master controller and a slave controller communicate with one another via a subsidiary bus system. The master controller communicates with a further onboard power supply system component of an onboard power supply system in a motor vehicle via a main bus system. If there is a present request to the slave controller, the latter is put into an operating mode and the master controller switches to a transmission mode, in which the master controller coordinates the communication between the slave controller and the onboard power supply system component.

The present request to the slave controller is a signal from a sensor that is connected to the slave controller or a function request to an actuator that is connected to the slave controller, for example. The function request comes from the sensor, the master controller or the onboard power supply system component, for example. If the function request comes from the onboard power supply system component, the request is first of all sent to the master controller, which forwards the request to the slave controller. In particular, the master controller translates the request, which is formulated using the protocol used within the main bus system, into a request that is compliant with the protocol used within the subsidiary bus system if a different protocol is used within the subsidiary bus system than in the main bus system. An acknowledgment from the slave controller to the onboard power supply system component or the signal from the sensor is first of all sent to the master controller, which forwards the message to the onboard power supply system component in compliance with the main bus system.

In the operating mode, the slave controller is capable of handling a request that is made to it immediately so long as there are no further requests being handled by it at present, and if the slave controller is configured to handle the request.

If there are no present requests to the slave controller, the slave controller is put into a sleep mode. By way of example, this is accomplished by virtue of the master controller sending a special command or the slave controller registering that there are no requests and automatically switching to sleep mode. In sleep mode, the slave controller has a lower power consumption than in operating mode. By way of example, functions and/or peripheral modules of the slave controller, such as a flash memory, are at least to some extent disconnected in sleep mode, and/or the clock frequency of a processor which the slave controller contains is lowered, or the processor is disconnected completely.

By way of example, such power saving measures mean that the slave controller is not able to handle a request made to it immediately, since this first of all requires the supply of power to the whole slave controller to be restored and particularly the clock frequency to be raised, for example. As soon as the slave controller is in sleep mode, the master controller switches to an undertaking mode.

If the onboard power supply system component sends to the slave controller a query which is not a present request to the slave controller while the latter is in sleep mode, the master controller responds to the query and leaves the slave controller in the sleep mode. In particular, the master controller does not forward the query to the slave controller. By way of example, the query is a query concerning the position of the actuator associated with the slave controller. Expediently, the slave controller sends all of the status information from the sensors and actuators associated with the slave controller to the master controller before the latter switches to the sleep mode.

The method allows the slave controller to be left in the power-saving sleep mode over a comparatively large period of time. In this case, the onboard power supply system component receives responses to queries to the slave controller in a shorter period of time than if the master controller has no undertaking mode, since the slave controller does not need to be woken and the coordination of the communication by the master controller is dispensed with.

Fittingly, during communication with the onboard power supply system component, the master controller that has been switched to the undertaking mode simulates the slave controller being in the operating mode. In other words, the onboard power supply system component cannot distinguish whether the response to a query to the slave controller comes from the master controller or from the slave controller itself. It is thus possible, in an already existing onboard power supply system, for just a subgroup of controllers to be operated with the method without having to make adjustments to the onboard power supply system component or to further modules of the onboard power supply system.

By way of example, the slave controller has an input without wakeup capability. An input without wakeup capability denotes an input to which a component, such as a sensor, is connected, the component not being able to terminate the sleep mode of the slave controller, that is to say not being able to put the slave controller into the operating mode.

Advantageously, after it has been in the sleep mode for a particular period of time, the slave controller polls the input without wakeup capability in order to determine whether there is a present request. This ensures that the slave controller handles all requests to itself. Fittingly, the slave controller repeats the polling whenever the period of time has elapsed for as long as the slave controller is in sleep mode, and for as long as there is no request on the input without wakeup capability. By way of example, the period of time is between 5 ms and 15 ms and particularly 10 ms. This allows energy-efficient operation of the slave controller, with requests thereto being handled without exception.

Expediently, the master controller switches to the sleep mode as soon as there is no present request to the master controller. By way of example, a present request to the master controller is a signal from a sensor connected to the master controller or a function request to an actuator connected to the master controller. In addition, such a request is particularly coordinating the communication between the slave controller and the onboard power supply system component and also responding to the queries to the slave controller.

Switching the master controller to the sleep mode allows a further reduction in current consumption to be achieved. By way of example, in the sleep mode, functions and/or peripheral modules of the master controller, such as a flash memory, are at least to some extent disconnected. In particular, the clock frequency of the master controller is reduced in the sleep mode in comparison with transmission mode. The power consumption of the master controller is essentially proportional to the clock frequency, which is why reduction is effective power saving. The clock frequency is particularly reduced to zero.

In addition, in the undertaking mode, for example, the clock frequency of the master controller is lower than in the transmission mode, since no communication takes place via the subsidiary bus system and hence no computation capacity is required for coordinating the communication of the slave controller.

By way of example, the master controller and/or the slave controller at least to some extent undertake tasks from a door controller in the motor vehicle. Typical tasks of a door controller are controlling and monitoring a door lock, a window lifter, lighting for a door, a rearview mirror or a seat arranged adjacent to the door, for example.

The bus system of an onboard power supply system in a motor vehicle, which bus system operates on the basis of the method according to the invention, has a main bus system, a subsidiary bus system, a master controller and also at least one slave controller.

In one preferred embodiment, the main bus system is a CAN bus system or a Flexray bus system. The subsidiary bus system is particularly a Lin bus system. Expediently, the main bus system is a CAN bus system and the subsidiary bus system is a Lin bus system, since these are in comparatively widespread use in automotive construction and there is no need for special adjustment of the cables for the, in particular, already existing, onboard power supply system or further controllers.

Other features which are considered as characteristic for the invention are set forth in the appended claims.

Although the invention is illustrated and described herein as embodied in a method for operating an electrical system of a motor vehicle and a bus system operating in accordance with the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing schematically shows an onboard power supply system in a motor vehicle, which onboard power supply system operates on the basis of the method according to the invention.

DETAILED DESCRIPTION OF THE INVENTION

Referring now to the single FIGURE of the drawing in detail, there is shown an onboard power supply system 1 in a motor vehicle having an onboard power supply system component 2 and a master controller 3 which communicate with one another via a main bus system 4. By way of example, the main bus system 4 is a CAN bus system and the onboard power supply system component 2 is a combined controller. In particular, the master controller 3 is a door controller and, by way of example, uses an actuator 5 to control lighting for a driver's door of the motor vehicle and an electric window opener that is provided in the driver's door and also uses an actuator 6 to control a lock that is integrated in the driver's door. The master controller 3 has a sensor 7 and a sensor 8 connected to it, the latter sensor monitoring the status of the lock, or opening of the driver's door.

Connected to the master controller 3, which has a transmission mode, an undertaking mode and a sleep mode, via a subsidiary bus system 10, which is particularly a LIN bus system, is a slave controller 12, which has an operating mode and a sleep mode. The slave controller 12 is associated with a further door of the motor vehicle. In particular the slave controller 12 controls a lock that is integrated in the door and also an electric window lifter associated with the door and lighting for the door. The lighting and the lock are controlled by an actuator 13 and by an actuator 14, respectively, which are each connected to the slave controller 12. A sensor 18 is connected to the slave controller 12 at an input 16 without wakeup capability which checks the status of the lock. A sensor 22 is connected to the slave controller 12 at a connection 20 with wakeup capability which monitors the opening of the door.

Activities which are controlled by the slave controller 12, and also sensor data which are captured and processed by the slave controller 12, and also the communication via the subsidiary bus system 10 that relates to the slave controller 12, are called present requests to the slave controller 12. The processing of the present requests to the slave controller 12 takes place in the operating mode of the slave controller 12. This means that, without exception, all of the functions and components of the slave controller 12 that are necessary for processing the present requests are activated and supplied with power, the components and functions being configured such that time-saving processing is assured.

As soon as there are no present requests to the slave controller 12, the master controller 3 sends a sleep request to the slave controller 12, whereupon the slave controller 12 sends the present status information from the sensors 18, 22 that are connected to the slave controller 12 and also from the actuators 13, 14 to the master controller 3 via the subsidiary bus system 10. The slave controller 12 then switches to the sleep mode, while the master controller 3 switches to the undertaking mode.

In the sleep mode, functions and peripheral modules, such as a flash memory, of the slave controller 12 are disconnected and a main processor that the slave controller 12 contains is disconnected or at least the clock frequency thereof is lowered. The use of this approach means that the slave controller 12 consumes less power in the sleep mode than in the operating mode.

The slave controller 12 is put into operating mode again by a wakeup or activity request that is sent via the subsidiary bus system 10 or by a sensor value from the sensor 22 that is connected to the input 20 with the wakeup capability on the slave controller 12, for example. In order to check whether there is a present request to the slave controller 12 on the sensor 18 that is connected to the input 22 without wakeup capability on the slave controller 12, the slave controller 12 automatically polls the status of the sensor 18. If the status of the sensor 18 has altered, the slave controller 12 changes to operating mode and communicates this to the master controller 3. If there is no alteration, the slave controller 12 remains in sleep mode. Whenever the period of time has elapsed, the slave controller 12 repeats the polling. This check on the sensor 18 takes place every 10 ms, for example.

If the slave controller 12 is in the sleep mode and the master controller 3 is in the undertaking mode and if there are also no present queries to the master controller 3, the master controller 3 switches to the sleep mode. Activities which are controlled by the master controller 3, and also sensor data which are captured and processed by the master controller 3, and also the communication via the subsidiary bus system 10 and the communication via the main bus system 4 that relates to the master controller 3 or to the slave controller 12, are called present requests to the master controller 3.

In the sleep mode, functions and peripheral modules, such as a flash memory, of the master controller 3 are disconnected and the clock frequency of a main processor that the master controller 3 contains is reduced. The use of this approach means that the master controller 3 consumes less power in the sleep mode than in the transmission or undertaking mode.

When the onboard power supply system component 2 polls to determine whether the door associated with the slave controller 12 is open or closed, the master controller 3 terminates the sleep mode and changes to the undertaking mode. Since the query is not a present request to the slave controller 12, the master controller 3 does not forward the query to the slave controller 12, but rather leaves the latter in the sleep mode. The master controller 3 sends to the onboard power supply system component 2 the status of the door opening sensor 22, which the slave controller 12 communicated before the slave controller 12 changed to the sleep mode. In this case, the master controller 3 signs the response using the identifier of the slave controller 12 such that the onboard power supply system component 2 cannot distinguish whether the slave controller 12 is in operating mode or in sleep mode. Subsequent to the response being sent, the master controller 3 switches to the sleep mode again.

Since no communication takes place via the subsidiary bus system 10 when the master controller 3 is in undertaking mode, it is not necessary for functions and peripheral modules of the master controller 3 which are responsible for the communication to be supplied with power. Therefore, these functions and modules are disconnected in undertaking mode, for example, and optionally the clock frequency of the main processor that the master controller 3 contains is reduced in comparison with transmission mode.

When the onboard power supply system component 2 sends the cue for the two doors controlled by the master controller 3 and the slave controller 12 to be unlocked, the master controller 3 switches to transmission mode, since the cue is also a present request to the slave controller 12. The master controller 3 uses the actuator 6 to unlock the lock integrated in the driver's door and checks execution by means of the sensor 7. Optionally, the master controller 3 sends confirmation of the execution to the onboard power supply system component 2 via the main bus system 4.

In addition, the master controller 3 reformulates the cue from the onboard power supply system component 2, which is formulated in compliance with the main bus system 4, into a cue to the slave controller 12 which is compliant with the subsidiary bus system 10, and sends the latter cue and also optionally the wakeup request to the slave controller 12. On the basis of the cues, the slave controller 12 changes to the operating mode and operates the actuator 14, which unlocks the door that is associated with the slave controller 12. The slave controller 12 uses the sensor 18 to check whether the lock is unlocked. When the door has been unlocked, the slave controller 12 sends confirmation of the unlocking to the onboard power supply system component 2. For this, the slave controller 12 sends the confirmation to the master controller 3 via the subsidiary bus system 10. The master controller 3 reformulates the confirmation in compliance with the main bus system 4 and forwards it to the onboard power supply system component 2.

Next, the master controller 3 sends the sleep request to the slave controller 12, with the slave controller 12 in turn first of all transmitting to the master controller 3 the status of the sensors 18, 22 connected thereto and of the actuators 13, 14 before it switches to the sleep mode and the master controller 3 switches to the undertaking mode. If there is no present request to the master controller 3, the latter likewise switches to sleep mode.

When the door associated with the slave controller 12 is opened, the sensor 22 registers this and wakes up the slave controller 12. The slave controller 12 activates the lighting for the door, for example, by means of the actuator 13 and sends the status of the sensor 22 to the master controller 3 and communicates that the slave controller 12 has activated the actuator 13. The master controller 3 switches to transmission mode.

By way of example, the master controller 3 activates the lighting for the driver's door, which is associated with the master controller 3, by the actuator 5 and sends information to the onboard power supply system component 2 to the effect that the door which is associated with the slave controller 12 has been opened and that the lighting for both doors has been activated. As soon as the door is closed, the slave controller 12 sends information about this to the master controller 3.

Subsequent to a prescribed period of time, for example after 5 s, the master controller 3 terminates the lighting for the driver's door and sends information to the slave controller 12 to the effect that it likewise needs to terminate the lighting. In addition, the master controller 3 puts the slave controller 12 into sleep mode when there are no further requests to the slave controller 12, the slave controller 12 in turn communicating the status of the sensors 18, 22 associated with the slave controller 12 and of the actuators 13, 14 to the master controller 3 before the slave controller switches to the sleep mode and the master controller 3 switches to undertaking mode.

LIST OF REFERENCE SYMBOLS

1 Onboard power supply system
2 Onboard power supply system component
3 Master controller
4 Main bus system
5 Actuator
6 Actuator
7 Sensor
8 Sensor
10 Subsidiary bus system
12 Slave controller
13 Actuator
14 Actuator
16 Input without wakeup capability
18 Sensor
20 Input with wakeup capability
22 Sensor

The invention claimed is:

1. A method for operating an onboard power supply system in a motor vehicle, the onboard power supply system having a master controller, a slave controller, in which the master controller communicates with the slave controller via a subsidiary bus system and an onboard power supply system component via a main bus system, which comprises the steps of:
putting the slave controller into an operating mode and switching the master controller to a transmission mode, in which the master controller coordinates communication between the slave controller and the onboard power supply system component if an actual request to the slave controller is present;
putting the slave controller into a sleep mode and switching the master controller to an undertaking mode, in which the master controller responds to queries from the onboard power supply system component to the slave controller if no actual request to the slave controller is present, wherein in the sleep mode, after a particular period of time, the slave controller polling an input of the slave controller without wakeup capability to determine whether there is a request present;
periodically repeating the polling, via the slave controller, whenever the particular period of time has elapsed for as long as the slave controller is in the sleep mode;
switching the master controller to the sleep mode when there is no request present to the master controller and reducing a clock frequency of the master controller in the sleep mode in comparison with the transmission mode; and
wherein at least one of the master controller or the slave controller at least to some extent accepts tasks from a door controller.

2. The method according to claim 1, wherein in the undertaking mode, during communication with the onboard power supply system component, the master controller simulates the slave controller being in the operating mode.

3. A bus system in an onboard power supply system in a motor vehicle, the bus system comprising:
a main bus;
a subsidiary bus system;
a master controller connected to said main bus and said subsidiary bus system;
at least one slave controller connected to said subsidiary bus system;
said slave controller is put into an operating mode and said master controller switches to a transmission mode, in which said master controller coordinates communication between said slave controller and an onboard power supply system component if an actual request to said slave controller is present;
said slave controller is put into a sleep mode and said master controller switches to an undertaking mode, in which said master controller responds to queries from the onboard power supply system component to said slave controller if no actual request to said slave controller is present, wherein in the sleep mode, after a particular period of time, said slave controller polling an input of the slave controller without wakeup capability to determine whether there is a request present;
the polling is periodically repeated, via said slave controller, whenever the particular period of time has elapsed for as long as said slave controller is in the sleep mode;
said master controller is switched to the sleep mode when there is no request present to said master controller and a clock frequency of said master controller is reduced in the sleep mode in comparison with the transmission mode; and
at least one of said master controller or said slave controller at least to some extent accepts tasks from a door controller.

4. The bus system according to claim 3, wherein:
said main bus is selected from the group consisting of a controller area network (CAN) bus system and a Flexray bus system; and
said subsidiary bus system is a local interconnect network (LIN) bus system.

5. A method for operating an onboard power supply system in a motor vehicle, the onboard power supply system having a master controller, a slave controller, in which the master controller communicates with the slave controller via a subsidiary bus system and an onboard power supply system component via a main bus system, which comprises the steps of:

putting the slave controller into an operating mode and switching the master controller to a transmission mode, in which the master controller coordinates communication between the slave controller and the onboard power supply system component if an actual request to the slave controller is present;

putting the slave controller into a sleep mode and switching the master controller to an undertaking mode, in which the master controller responds to queries from the onboard power supply system component to the slave controller, if no actual request to the slave controller is present, wherein in the sleep mode, after a particular period of time, the slave controller polling an input of the slave controller without wakeup capability to determine whether there is a request present, wherein the slave controller remains in the sleep mode;

periodically repeating the polling, via the slave controller, whenever the particular period of time has elapsed for as long as the slave controller is in the sleep mode;

switching the master controller to the sleep mode when there is no request present to the master controller and reducing a clock frequency of the master controller in the sleep mode in comparison with the transmission mode; and wherein at least one of the master controller or the slave controller at least to some extent accepts tasks from a door controller.

* * * * *